United States Patent [19]  
Koizumi et al.

[11] Patent Number: 4,879,613  
[45] Date of Patent: * Nov. 7, 1989

[54] CASSETTE TAPE RECORDER FOR MULTIPLE CASSETTE TAPES

[75] Inventors: Satoru Koizumi; Daisuke Teshima; Yoshio Katayama, all of HigashiHiroshima, Japan

[73] Assignee: Sharp Kabushiki Kaisha, Osaka, Japan

[*] Notice: The portion of the term of this patent subsequent to Jan. 10, 2006 has been disclaimed.

[21] Appl. No.: 227,480

[22] Filed: Aug. 1, 1988

Related U.S. Application Data

[63] Continuation of Ser. No. 852,625, Apr. 16, 1986, abandoned.

[30] Foreign Application Priority Data

Apr. 17, 1985 [JP] Japan .................................. 60-81897  
May 20, 1985 [JP] Japan ................................ 60-109953  
May 20, 1985 [JP] Japan ................................ 60-109954  
May 20, 1985 [JP] Japan ................................ 60-109955

[51] Int. Cl.[4] .............................................. G11B 15/68  
[52] U.S. Cl. ........................................ 360/92; 360/91  
[58] Field of Search ........................ 360/92, 91, 93, 94; 242/197–201, 193

[56] References Cited

U.S. PATENT DOCUMENTS 3,999,219 12/1976 Andrews ................................. 360/93  
4,029,269 6/1977 Clarridge .  
4,230,909 10/1980 Baum .  
4,396,803 8/1983 Hoshimoto ............................. 360/92  
4,551,775 11/1985 Koizumi et al. .  
4,698,705 10/1987 Umino .................................... 360/92

FOREIGN PATENT DOCUMENTS

2802255 8/1978 Fed. Rep. of Germany .  
0087510 7/1979 Japan .

Primary Examiner—Stuart N. Hecker  
Assistant Examiner—David J. Severin  
Attorney, Agent, or Firm—Birch, Stewart Kolasch & Birch

[57] ABSTRACT

A tape recorder includes: a cassette tape compartment in which a plurality of cassette tapes are detachably mounted; a capstan for coaxially mounting the plurality of cassette tapes housed in the cassette tape compartment; a roller provided for each of the cassette tapes and which can be pressed against the capstan; a playback and/or recording head provided for each of the cassette tapes; a selector for selecting the cassette tape to be driven and a separate selector for selecting one of a plurality of cassette tape drive modes; a mode position selector to be retained in the position corresponding to the mode selected by the mode selector; a controller for controlling the position of the roller provided for each of the cassette tapes according to the position of the mode position selector; and a device for electrically enabling the playback and/or recording head to operate for playback of at least one of the cassette tapes or for recording on at least one of the cassette tapes.

10 Claims, 9 Drawing Sheets

FIG. 1

PAUSE STOP REW FF PLAY REC
     EJECT

CASSETTE TAPE RECORDER FOR MULTIPLE CASSETTE TAPES

This application is a continuation of application Ser. No. 06/852,625 filed on Apr. 16, 1986, now abandoned.

BACKGROUND OF THE INVENTION

The present invention relates to a tape recorder, or more particularly to a tape recorder in which a plurality of cassette tapes are mounted in a pile.

Recently tape recorders have been proposed in which more than one cassette tape are mounted in a pile in the cassette compartment with one capstan being shared among the cassette tapes. To permit independent running of each cassette or serial driving of multiple cassette tapes, the above conventional tape recorder unavoidably has a complicated construction. Moreover, when driving multiple cassette tapes mounted in a pile on the same capstan, the vibration of the capstan shaft has a bad effect on the recording or reproduction of cassette tapes mounted near the top of the capstan shaft.

SUMMARY OF THE INVENTION

To solve the above-mentioned problems of the conventional cassette tape recorder, an object of the present invention is to provide a tape recorder that can drive a plurality of cassette tapes sequentially, simultaneously and/or independently on one capstan shaft.

Another object of the present invention is to provide a mode selection device in a tape recorder capable of driving a plurality of cassette tapes on one capstan shaft, which device permits selection of sequential drive, simultaneous drive or independent drive for the tape recorder operation mode, by a simple operation.

Other objects and further scope of applicability of the present invention will become apparent from the detailed description given hereinafter. It should be understood, however, that the detailed description and specific examples of the invention, while indicating preferred embodiments, are given by way of illustration only, since various changes and modifications within the spirit and scope of the invention will become apparent to those skilled in the art from this detailed description.

To achieve the above objects, a tape recorder of an embodiment of the present invention comprises a cassette tape compartment in which a plurality of cassette tapes are detachably mounted on a capstan which coaxially holds the multiple cassette tapes in the cassette tape compartment, roller means which is installed for each of the cassette tapes to pressure hold the tapes on the capstan, a playback and/or record head installed for each of the multiple cassettes, means for selecting one of the multiple cassette tape drive modes, mode position select means which is held in position according to mode selected by the mode selection means, control means which controls the position of the roller means installed for each of the multiple cassette tapes, according to the position of the mode position select means, and means which electrically drives at least one of the heads of the plurality of cassette tapes for recording or reproduction.

The above-mentioned cassette tape drive modes contains at least one of the following modes: a mode for independently driving one of the multiple cassette tapes, a mode for simultaneously driving two or more cassette tapes, and a serial drive mode for serially driving multiple cassette tapes in sequence from a first cassette tape to a second cassette tape. The above-mentioned tape recorder may contain a first fast-forward means for winding at least one of the multiple cassette tapes rapidly in a first direction, second fast-forward means for winding at least one of the cassette tapes in a second direction (the reverse direction of the first direction), means for running at least one of the multiple cassette tapes at a fixed speed in the first or second direction, means which interlocks with the fixed-speed running means and records information on at least one of the cassette tapes, means which interlocks with the fixed-speed running means and plays back information on at least one of the multiple cassette tapes, means for stopping the operation of at least one of the first fast forward means, second fast forward means, fixed-speed running means, recording means and playback means, and means for temporarily pausing the operations of at least one of the first fast forward means, second fast forward means, fixed-speed running means, recording means and playback means.

Each of the multiple cassette tapes may be operated by at least one of the first fast forward means, second fast forward means, fixed-speed running means, recording means, playback means, operation stop means and operation pause means. The cassette tape closer to the capstan bearing may be operated by the same number of means as or a larger number of means than the cassette tape farther from the capstan bearing.

At least one of the first fast forward means, second fast forward means, fixed-speed running means, recording means, playback means, operation stop means and operation pause means may be shared by the multiple cassette tapes.

A control panel may be installed for controlling at least two of the first fast forward means, second fast forward means, fixed-speed tape running means, recording means, playback means, operation stop means and operation pause means. The control panel contains an operation button for each of at least two of the above means, and the area for the operation buttons for the means shared by the multiple cassette tapes may be wider than the area for the operation buttons for means not shared by the multiple cassette tapes.

The tape recorder may be equipped with mode detection means which interlocks with the roller means position control means and electrically detects the present cassette tape drive mode.

For the serial drive mode, the tape recorder is equipped with serial drive control means which operates the roller means position control means, so that the roller means which has been pressed against the capstan for the first cassette tape is released from the capstan when the first cassette tape has been wound to the end, and the roller means for the second cassette tape that has been kept released from the capstan while the first cassette tape is running is pressed against the capstan to start running the second cassette tape.

BRIEF DESCRIPTION OF THE DRAWINGS

The present invention will become more fully understood from the detailed description given herein and below and the accompanying drawings which are given by way of illustration only, and thus are limitations of the present invention and wherein:

FIGS. 5 through 9 are construction diagrams of the pressure prevention mechanisms for a pinch roller and idler; FIG. 5 for the stop state in the T2 mode; FIG. 6 for the play state in the serial mode; FIG. 7 for the play state in the T2 mode, FIG. 8 for the play state in the T1 mode and FIG. 9 for the operation state in the dubbing mode; FIG. 10 for the serial mode, FIG. 11 for the T2 mode, FIG. 12 for the T1 mode and FIG. 13 for the dubbing mode.

DETAILED DESCRIPTION OF THE INVENTION

Figure 1:
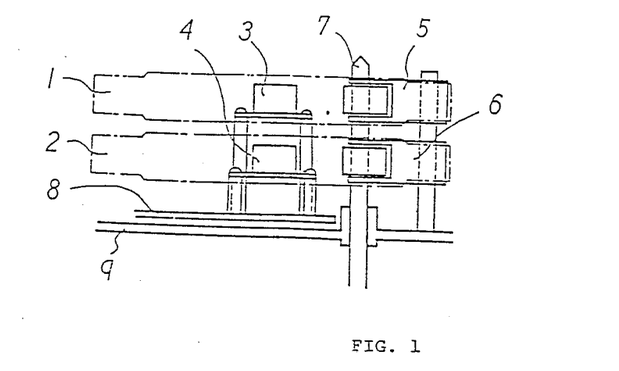
FIG. 1 is a schematic construction diagram showing an embodiment of a tape recorder of the present invention.

The following paragraphs describe an embodiment of the present invention with reference to the accompanying drawings. FIG. 1 shows the positions of the cassette tapes in a preferred embodiment of the present invention.

A plurality of (two) cassette tapes 1 and 2 are mounted in a pile coaxially on a capstan 7 and reel stand (not shown). A plurality of (two) magnetic heads 3 and 4 and pinch rollers 5 and 6 are located in positions facing the magnetic tape surfaces of cassette tapes 1 and 2, respectively. The two magnetic heads 3 and 4 are mounted on an identical reference plate 8. The pinch rollers 5 and 6 are operable independently.

Figure 2:
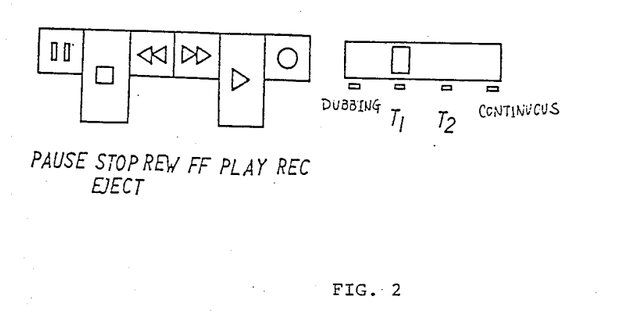
FIG. 2 is a plan view of the operation buttons and mode selector buttons.

FIG. 2 shows an example of the layout of the operation buttons. In this embodiment of the tape recorder in which two tapes are loaded, either of the tapes is provided with functions for play (PLAY), record (REC), fast-forward (FF), rewind (REW), stop and eject (STOP/EJECT) and pause (PAUSE), and the other provided only with functions for play and stop/eject. Both of the cassette tapes may have all the functions. In the following description, the side dedicated for play is referred to as T1 and the side with all the functions as T2. As shown in FIG. 1, since the upper cassette tape 1 is affected more by the vibration (tilt) of capstan 7 than the lower cassette tape 2, the lower cassette tape 2 is given the major functions as T2 tape and the upper cassette tape 1 is dedicated for play only as the T1 tape.

The operation buttons for PLAY and STOP/EJECT which are common to the T1 and T2 tapes are shared for the T1 and T2 tape. To increase operationability, these buttons are larger than the rest. Selection between T1 and T2 is made by depressing a separately installed mode selector button. In addition to the so-called dubbing function in which information reproduction from the T1 tape and recording of the reproduced information on the T2 tape are performed simultaneously, the tape recorder of this invention has a serial reproduction function in which the T2 tape begins playing after reproduction of the T1 tape completes. Selection between these modes (FIG. 2) is also performed by the mode selector button.

Figure 3:
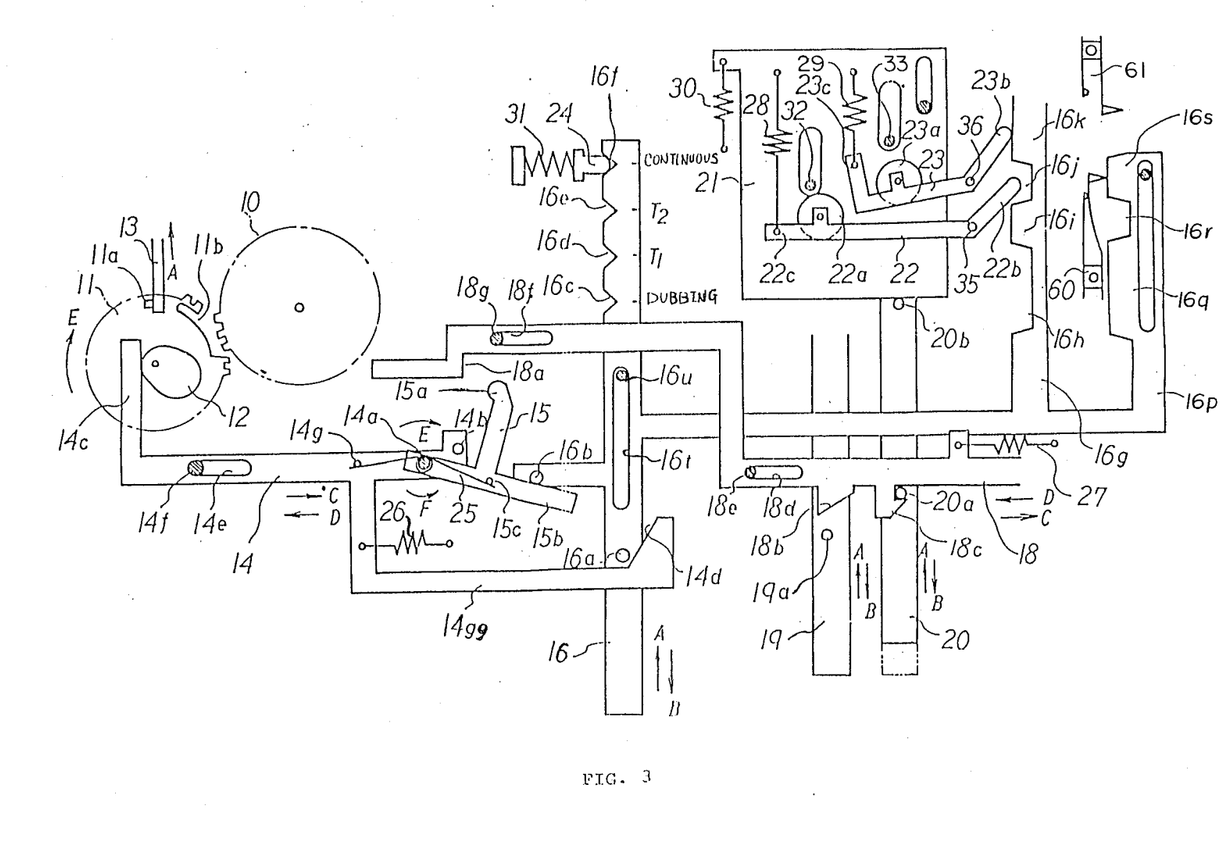
FIG. 3 is a construction diagram showing the mode selection mechanism of the tape recorder in the serial play mode.
Figure 4:
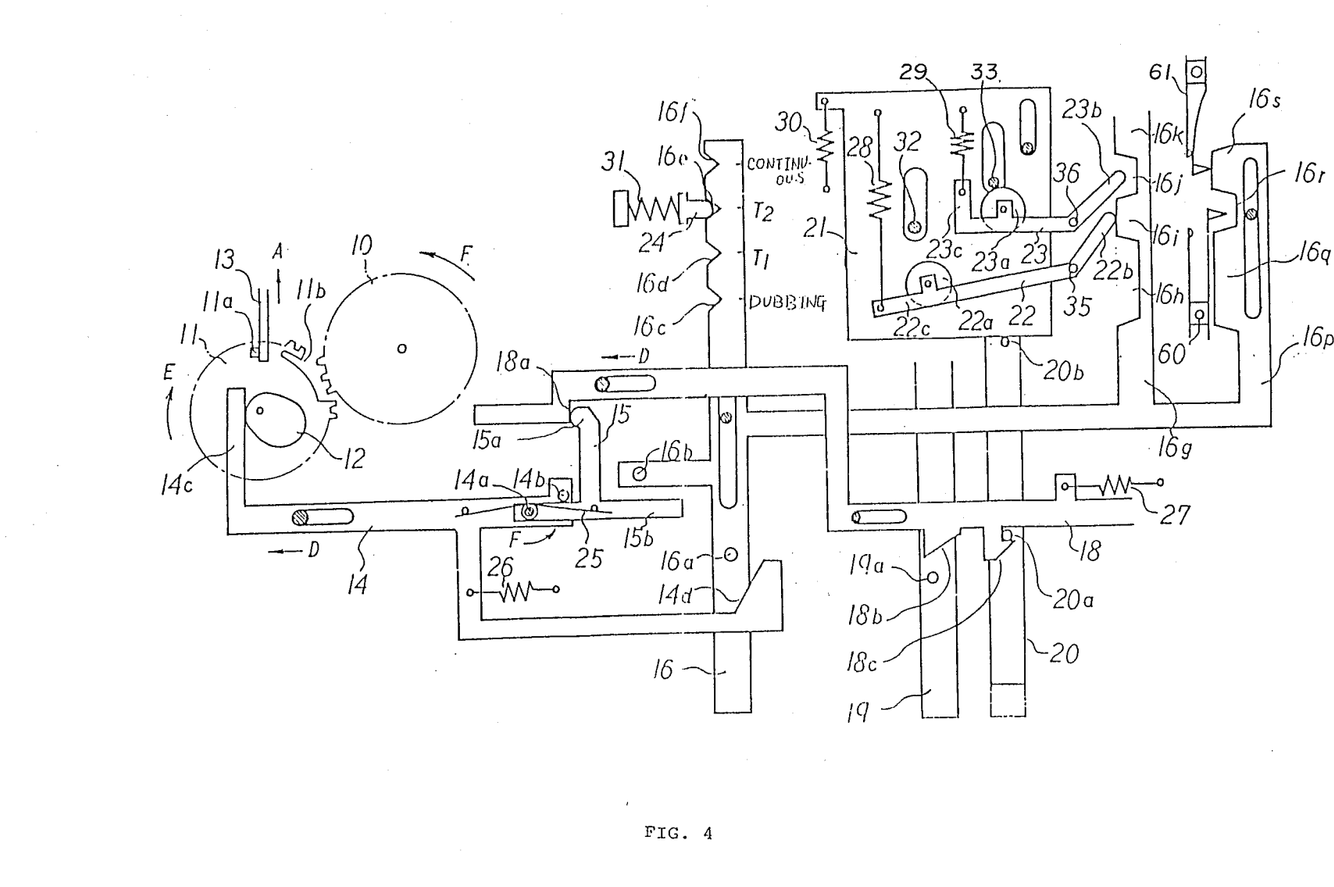
FIG. 4 is another construction diagram showing the mode selection mechanism of the tape recorder in the T2 play mode.

FIGS. 3 and 4 show the mode selector mechanism. Rotation force is transmitted from a rotation drive source to a gear 10. A cam gear 11 with non-teeth sector 11b is mounted coaxially and integrally with a cam 12 at such a position that it is engaged with the gear 10. Due to the engagement between a projection 11a formed on the cam gear 11 and a trigger lever 13, however, the non-teeth sector 11b of the cam gear 11 is made to face the gear 10 so that the cam gear 11 is not rotated by the gear 10. The trigger lever 13 interlocks with an auto-stop sensor (not shown) which detects the end of the tape. When the sensor detects the end of the tape, the trigger lever 13 moves in the direction A so that it is disengaged from the projection 11a of the cam gear 11, thus enabling the cam gear 11 to rotate in the direction E. A mode selector lever 14 includes an arm 14c which comes in contact with the cam 12 integrally formed with the cam gear 11 and is movable in the directions C and D within the range limited by a pin 14f inserted in an elongated hole 14e in the mode selector lever 14. A lock release plate 15 is mounted on the mode selector lever 14 in such a manner that it is rotatable around an axis 14a formed on the lever 14. The lock release plate 15 has a projection 15a and an arm 15b and is always forced in the direction F by a spring 25 whose ends are connected with pins 15c and 14g, respectively. The rotation of the lock release plate 15 is restricted by a stopper pin 14b provided on the mode selector lever 14. The mode selector lever 14 has an arm 14g with an inclined section 14d. The mode selector lever 14 is forced in the direction C by a spring 26.

A play lever 20 and stop lever 19 are mounted so that they are slidable along the directions A and B and they are forced in the direction B by a spring (not shown). When the play lever 20 is depressed, a projection 20b formed on the play lever 20 pushes a sub-chassis 21 in the direction A while a projection 20a comes in engagement with a projection 18c on a lock plate 18. Thus, the play lever 20 is held in position for operation. The stop lever 19 also has a projection 19a. The lock plate 18 has a projection with a inclined section 18b at a position corresponding to the projection 19a of the stop lever 19. When the stop lever 19 is depressed, the projection 19a pushes the inclined section 18b of the lock plate 18 so that the lock plate 18 moves in the direction D, releasing the engagement between the projection 18c of the lock plate 18 and the projection 20a of the play lever 20. Then, the entire mechanism including the play lever 20 resumes the stop state. The lock plate 18 also includes an arm with a projection 18a at a position corresponding to the projection 15a of the lock release plate 15. The lock plate 18 is forced by a spring 27 in the direction C but restricted by pins 18e and 18g inserted in elongated holes 18d and 18f, respectively, formed in the lock plate 18.

A selector plate 16 is slidable in the directions A and B but its sliding motion is limited by a pin 16u inserted in an elongated hole 16t formed in the selector plate 16. The selector plate 16 has recesses 16f, 16e, 16d and 16c. A positioning pin 24 is positioned in one of these recesses, as pressed by a spring 31. In the present embodiment, the tape recorder is in the serial mode when the pin 24 is in the recess 16f, the T2 mode when the pin 24 is in the recess 16e, the T1 mode when the pin 24 is in the recess 16d, and the dubbing mode when the pin 24 is in the recess 16c.

The selector plate 16 has a projection 16b at a position corresponding with the arm 15b of the lock release plate 15. When the selector plate 16 is in the serial mode position, the projection 16b pushes the arm 15b of the lock release plate 15 so that the lock release plate 15 is rotated in the direction E to the extent that the projection 15a of the lock release plate 15 does not contact with the projection 18a of the lock plate 18 when the mode selector lever 14 slides in the direction D. When the selector plate 16 is in the T1, T2 or dubbing mode position, the projection 16b is shifted in the direction A, allowing the lock release plate 15 to rotate in the direction F by the force of the spring 25 until the projection 15a comes in contact with the projection 18a of the lock plate 18.

At this time, the lock release plate 15 is positioned by the stopper pin 14b. With this state, if the mode selector lever 14 shifts in the direction D, the projection 15a of the lock release plate 15 pushes the projection 18a of the lock plate 18, causing the lock plate 18 to slide in the direction D. As a result, the play lever 20 is unlocked. The selector plate 16 has a projection 16a at a position corresponding to the inclined section 14d of the mode selector lever 14. When the selector plate 16 is in the serial mode position, the projection 16a comes in contact with the inclined section 14d, so that the selector plate 16 is made to move in the direction A as the mode selector lever 14 shifts in the direction D. The selector plate 16 also contains an arm 16g with alternate projections and recesses 16h, 16i . . . which serve to operate necessary pinch rollers 22 and/or 23 according to the selected mode. (This operation will be described later.) The selector plate 16 operates interlocking with the mode selector button shown in FIG. 2.

When the selector plate 16 is in the serial mode position, the inclined section 14d of the mode selector lever 14 serves to move the selector plate 16 in the direction A so that the mode is switched over to the T2 mode. In contrast, when the selector plate 16 is in the T2, T1 or dubbing mode position, the lock release plate 15 serves to move the lock plate 18 in the direction D, so that the play lever 20 is unlocked to resume the stop state.

The selector plate 16 has another arm 16p which is provided with a recess 16r between projections 16q and 16s. Mode detector switches 60 and 61 are mounted at positions facing the projections 16q and 16s and the recess 16r. The mode detector switches 60 and 61 are opened or closed as the selector plate 16 moves, electrically detecting the current operation mode and selecting the appropriate circuit accordingly.

Figure 5:
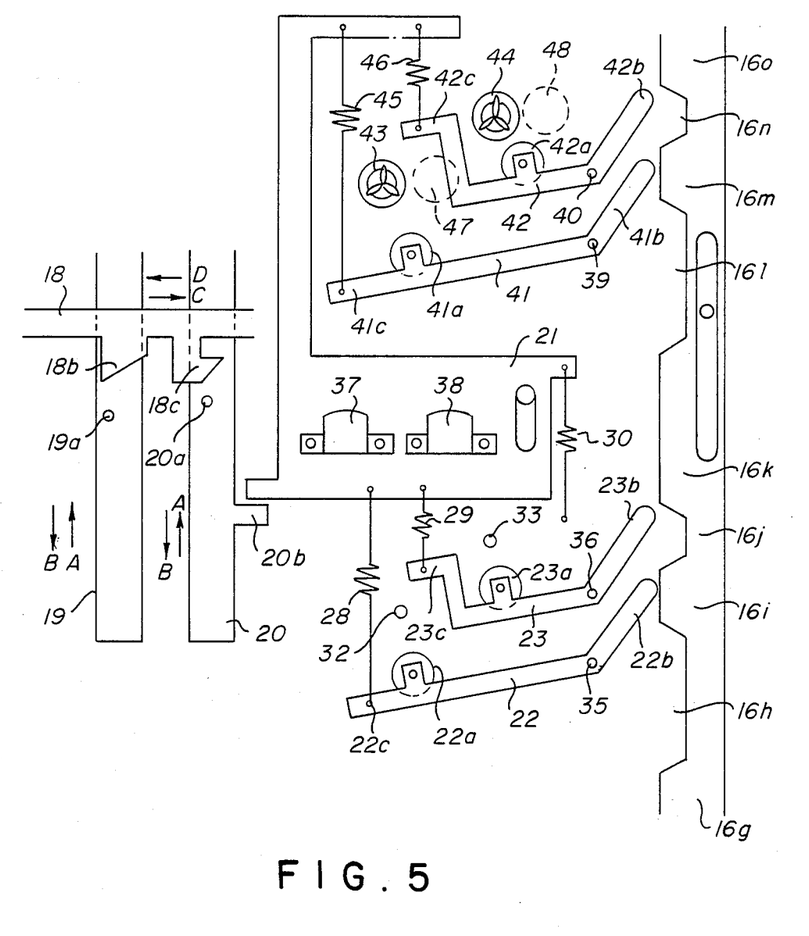

FIGS. 5 through 9 shows the selection mechanism such as pinch rollers in various operation modes. FIG. 5 shows the stop state in the T2 mode. As described earlier, the play lever 20 and stop lever 19 are mounted to be slidable in the directions A and B and forced in the direction B by springs (not shown). The play lever 20 and stop lever 19 have the projections 20a and 19a respectively. The play lever 20 is also provided with the projection 20b which pushes the sub-chassis 21 in the direction A. The lock plate 18 is slidable in the directions C and D and forced in the direction C by a spring (not shown). The lock plate 18 has the projections 18c and 18b at the positions corresponding to the projections 20a and 19a formed on the play lever 20 and stop lever 19, respectively, so that the lock plate 18 locks or unlocks the play lever 20. The pinch roller lever 22 on the T1 side and the pinch roller lever 23 on the T2 side are rotatable around the supporting axes 35 and 36 and have arms 22b and 23b, respectively. Pinch roller arms 22c and 23c are connected to the sub-chassis 21 by springs 28 and 29, respectively, in such a manner that the rollers 22a and 23a pressure-contact with the capstans 32 and 33, respectively, during the play or record mode. As the sub-chassis 21 moves in the direction A, the pinch rollers 22a and 23a are pressed against the capstans 32 and 33 by the force of the springs 28 and 29, respectively. Idler levers 41 and 42 are also rotatable around supporting axes 39 and 40 and have arms 41b and 42b, respectively. During the play or record mode, rollers 41a and 42a are pressed against reel stands 43 and 44 and rotation drive sources 47 and 48, respectively, at a time, so that the rotation force is transmitted from the rotation drive sources to the reel stands 43 and 44. In the present embodiment, arms 41c 42c are connected by springs 45 and 46, respectively, to the sub-chassis 21, so that the idler rollers 41a and 42a pressure-contact with the reel stands 43 and 44 and the rotation drive sources 47 and 48 by the force of the springs 45 and 46, respectively, as the sub-chassis 21 moves in the direction A.

The arm 16g of the selector plate 16 has alternate recesses and projections, 16h, 16i, 16j and 16k at positions corresponding to the arms 22b and 23b of the pinch roller levers 22 and 23, respectively. When the pinch roller arms 22b and 23b come in contact with the projections 16i and 16k depending upon the position of the selector plate 16, the pinch roller for the selected mode is pressed against the capstan 32 or 33.

The selector plate 16 has the alternate recesses and projections 16l, 16m, 16n and 16o at positions corresponding to the arms 41b and 42b of the idler levers 41 and 42, respectively. Depending upon the position of the selector plate 16, the projections 16m and 16o come in contact with the idler arms 41b and 42b, respectively. Accordingly, the idler roller for the selected mode is pressed against the reel stand 43 or 44 and the rotation drive source 47 or 48 simultaneously, transmitting the rotation force to the necessary reel stand.

For convenience in explanation, the capstans 32 and 33, reel stands 43 and 44, pinch rollers 22 and 23 and idlers 41 and 42 are separately shown in FIGS. 3 through 9, although they are actually coaxial with one another. It is not to mention, however, that they may be constructed independently.

The following paragraph describes the operation mode of an embodiment of the present invention with reference to the drawings.

(1) Serial Mode (Continuous Mode)

Figure 6:
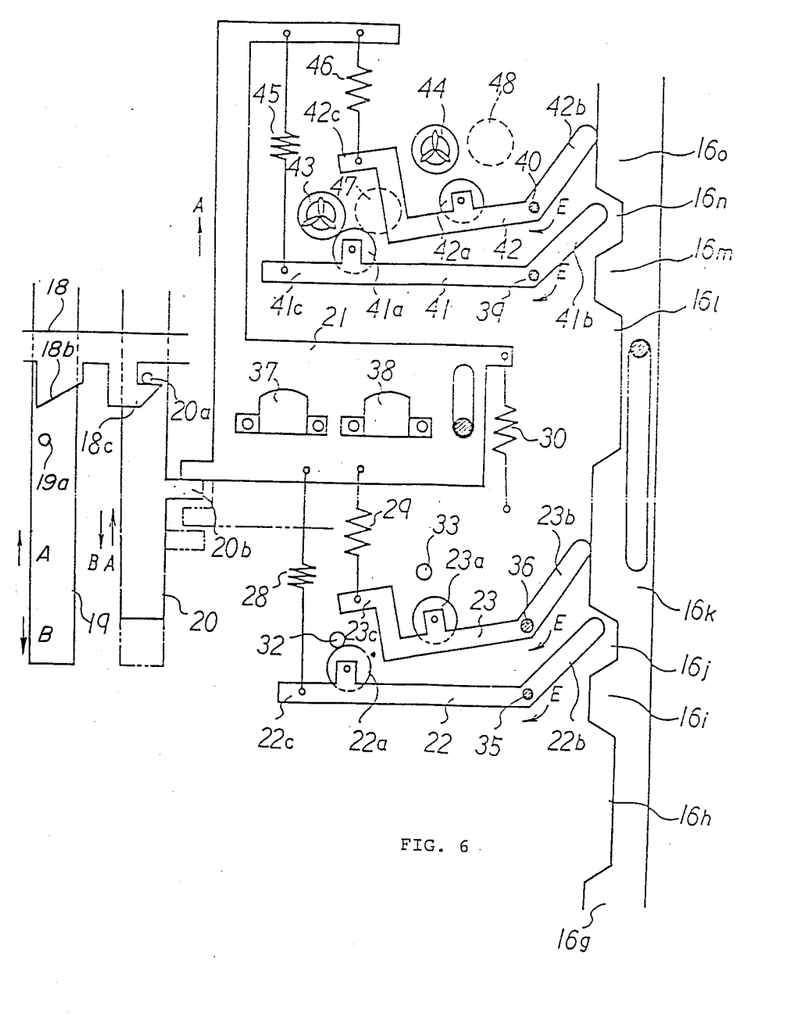

FIG. 6 shows the serial operation mode of the present invention. The serial playback function of the present invention is to run the T1 tape for playback first and shift the selector plate to the T2 mode position when the T1 tape has been wound to the end, so that the pinch rollers, idlers (reel stands) and circuits are switched over for the T2 mode. Therefore, in the serial mode, only the T1 side is operable. When the play lever 20 is depressed in the stop state, the sub-chassis 21 slides in the direction A. Magnetic heads 37 and 38 on the sub-chassis 21 are pressed against the magnetic tape. The T1 side pinch roller 22a and T2 side pinch roller 23a rotate in the direction E around the supporting axes 35 and 36, respectively. The T1 side idler 41a and T2 side idler 42a also rotate in the direction E around the supporting axes 39 and 40, respectively. At this time, the projection 16k of the selector plate arm 16g is positioned facing the arm 23b of the T2 side pinch roller lever 23, and the recess 16j is positioned facing the T1 side pinch roller arm 22b. Therefore, the rotation in the direction E of the T2 side pinch roller lever 23 is restricted because the arm 23b comes in contact with the projection 16k. Consequently, the pinch roller lever 23 will not press the capstan 33 while only the T1 side pinch roller 22a is pressed against the capstan 32 by the spring force. Similarly, the projection 16o of the selector plate arm 16g is positioned facing the T2 side idler arm 42b, and the recess 16n is positioned facing the T1 side idler arm 41b. The rotation in the direction E of the T2 idler is restricted because the arm 42b comes in contact with the projection 16o. Consequently, the T2 side idler 42a is not pressed against the reel stand 44 while only the T1 side idler 41a is pressed against the reel stand 43 and rotation drive source 47 simultaneously by the spring force. As a result, only the T1 side reel stand 43 is operated.

(2) T2 Mode

Figure 7:
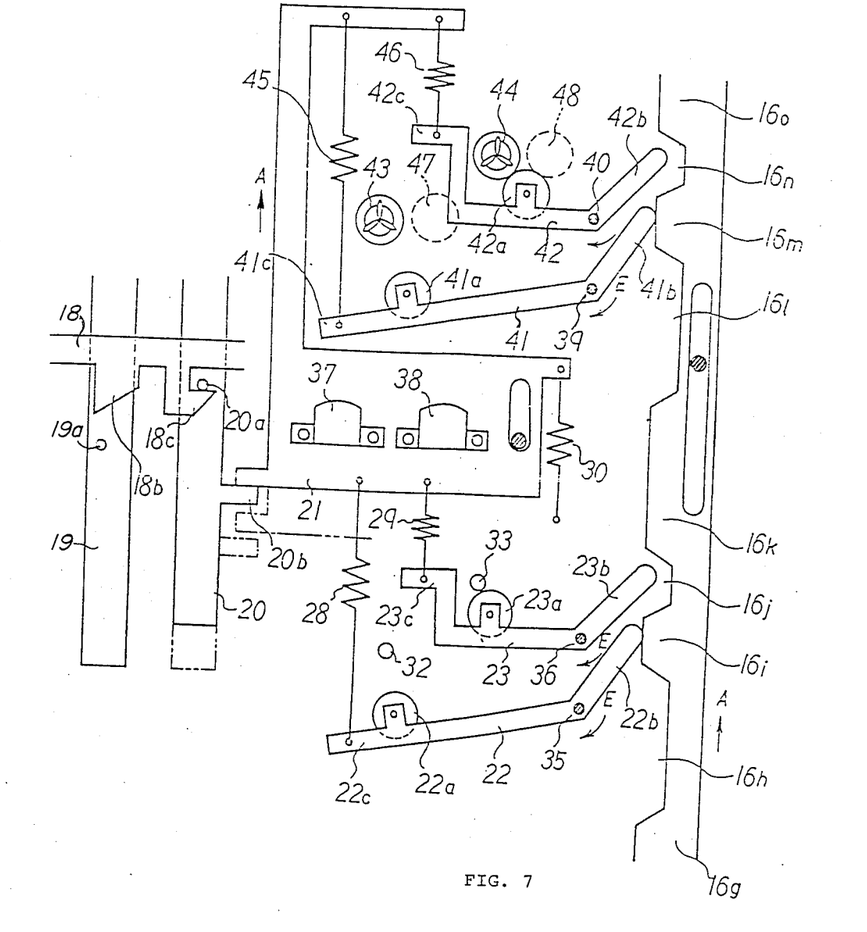

FIG. 7 shows the T2 operation mode of the present invention. The selector plate arm 16g is shifted by one step in the direction A from the serial mode position, so that the projection 16i of the selector plate arm 16g is positioned facing the arm 22b of the T1 side pinch roller lever 22 and the recess 16j is positioned facing the arm 23b of the T2 side pinch roller lever 23. The projection 16m of the selector plate arm 16g is positioned facing the arm 41b of the T1 side idler lever 41 and the recess 16n is positioned facing the arm 42b of the T2 side idler lever 42. When the play lever 20 is depressed in the stop state, the sub-chassis 21 slides in the direction A. Then, the magnetic heads 37 and 38 are pressed against the magnetic tape. The pinch roller levers 22 and 23 forced by the springs 28 and 29 rotate in the direction E around the supporting axes 35 and 36, respectively. The idler levers 41 and 42 forced by the springs 45 and 46 also rotate in the direction E around the supporting axes 39 and 40, respectively. However, rotation in the direction E of the T1 side pinch roller lever 22 is restricted because the arm 22b comes in contact with the projection 16i of the selector plate arm 16g, so that the T1 side pinch roller 22a is not pressed against the capstan 32. The T2 side pinch roller 23a alone is pressed against the capstan 33 by the force of the spring 29. Similarly, rotation in the direction E of the T1 side idler lever 41 is restricted because the arm 41b comes in contact with the projection 16m of the selector plate arm 16g, so that the T1 side idler 41a is not pressed against the reel stand 43. The T2 side idler 42a alone is pressed against the reel stand 44 and rotation drive source 48 by the force of the spring 46. As a result, the T2 side reel stand 44 alone is operated.

(3) T1 Mode

Figure 8:
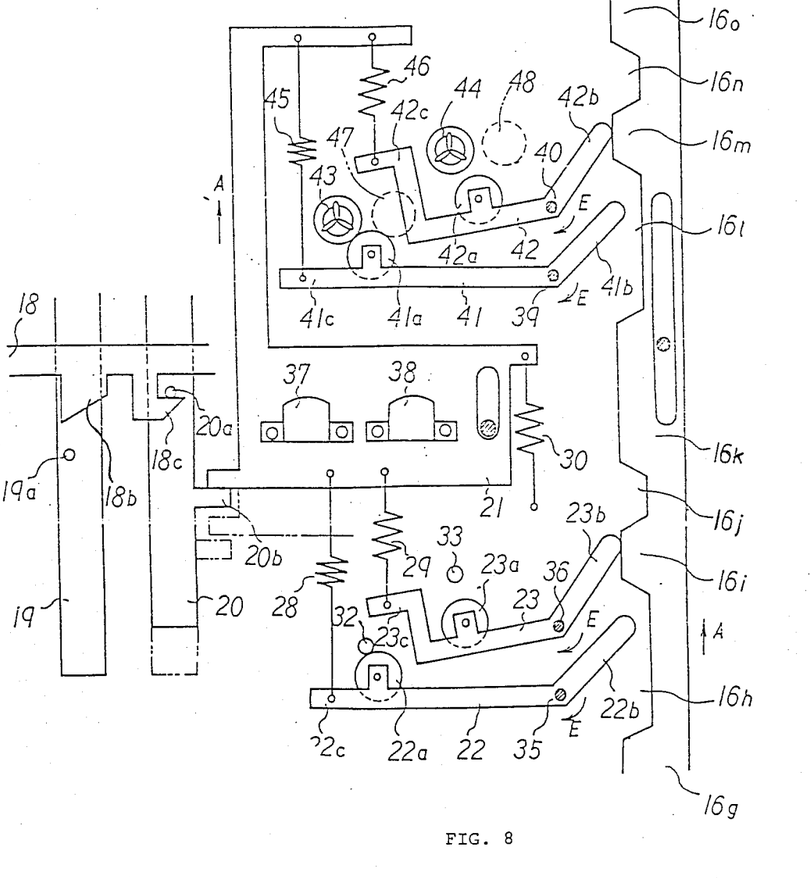

FIG. 8 shows the T1 operation mode of the present invention. The selector plate arm 16g is further shifted by one step in the direction A from the T2 mode position, so that the recess 16h of the selector plate arm 16g is positioned facing the arm 22b of the T1 side pinch roller lever 22 and the projection 16i is positioned facing the arm 23b of the T2 side pinch roller lever 23. The recess 16l of the selector plate arm 16g is positioned facing the arm 41b of the T1 side idler lever 41 and the projection 16m is positioned facing the arm 42b of the T2 side idler lever 42.

Similar to the serial or T2 mode, the pinch roller levers 22 and 23 and the idler levers 41 and 42 rotate in the direction E as the sub-chassis 21 slides in the direction A. Rotation of the T2 side pinch roller lever 23 in the direction E is, however, restricted because the arm 23b comes in contact with the projection 16i of the selector plate arm 16g, so that the T2 side pinch roller 23a is not pressed against the capstan 33. The T2 side pinch roller 22a alone is pressed against the capstan 32 by the force of the spring 28. Similarly, rotation of the T2 side idler lever 42 is restricted because the arm 42b comes in contact with the projection 16m of the selector plate arm 16g, so that the T2 side idler 42a is not pressed against the reel stand 44. The T1 side idler 41a alone is pressed against the reel stand 43 and rotation drive source 47 by the force of the spring 45. As a result, the T1 side reel stand 43 alone is operated.

(4) Dubbing Mode

Figure 9:
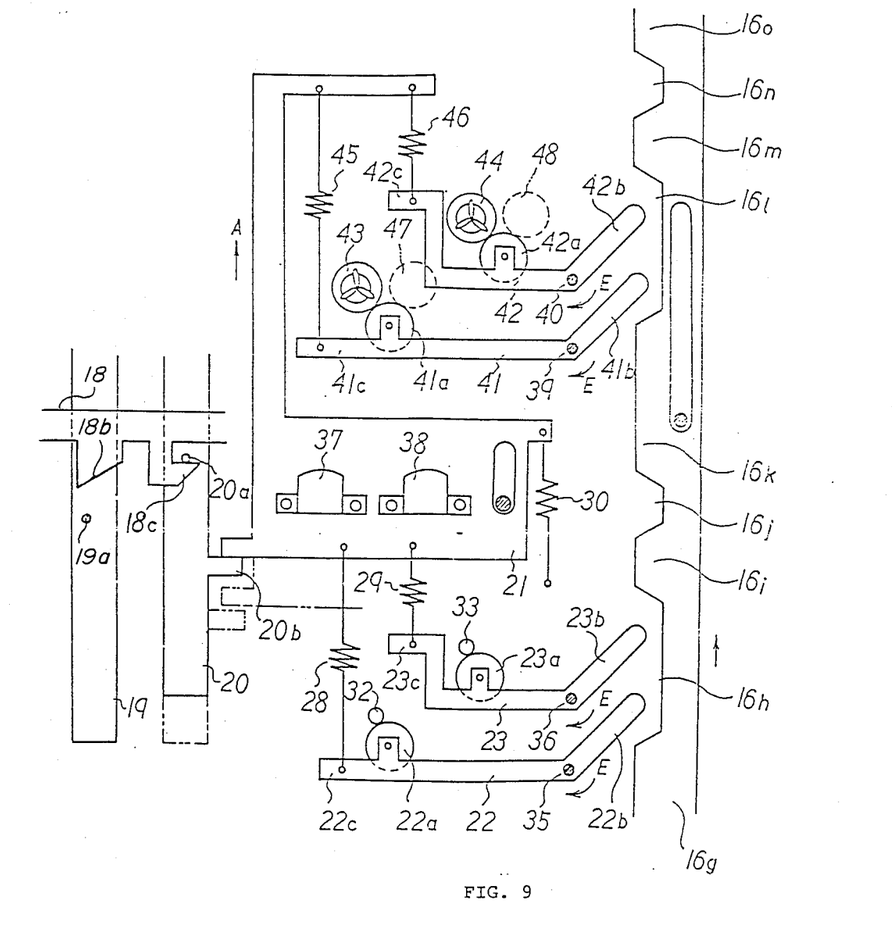

FIG. 9 shows the dubbing operation mode of the present invention. In this mode, the pinch rollers 22a and 23a and idlers 41a 42a are all pressed against the capstans 32 and 33 and reel stands 43 and 44, respectively, for driving the magnetic tapes on the T1 side and T2 side at the fixed rate. The electric circuit is selected so that signal reproduced on the T1 side is recorded on the T2 side. The selector plate arm 16g is shifted one step in the direction A from the T1 mode position, so that the recess 16h of the selector plate arm 16g is positioned facing the arm 22b of the T1 side pinch roller lever 22 and the arm 23b of the T2 side pinch roller lever 23. The recess 16l of the selector plate arm 16g is positioned facing the arm 41b of the T1 side idler lever 41 and the arm 42b of the T2 side idler lever 42. When the play lever 20 and record lever (now shown) are depressed in the stop state, the sub-chassis 21 slides in the direction A. Then, the magnetic heads 37 and 38 on the sub-chassis are pressed against the magnetic tape. The pinch roller levers 22 and 23 connected by the springs 28 and 29 to the sub-chassis 21 rotate in the direction E around the supporting axes 35 and 36, respectively. The idler levers 41 and 42 connected by the springs 45 and 46 to the sub-chassis 21 also rotate in the direction E around the supporting axes 39 and 40, respectively. Thus, both T1 side pinch roller 22a and T2 side pinch roller 23a are pressed against the capstans 32 and 33 by the force of the springs 28 and 29, respectively, without restricting rotation by the selector plate arm 16g. Similarly, both T1 side idler 42a and T2 side idler 42a are pressed against the reel stands 43 and 44 and rotation drive sources 47 and 48 by the force of the springs 45 and 46, respectively, without restricting rotation by the selector plate arm 16g. As a result, both T1 side reel stand 43 and T2 side reel stand 44 are operated.

Figure 10:
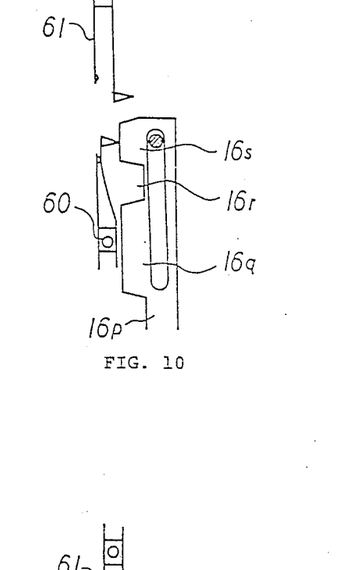
FIGS. 10 through 13 are construction diagrams showing the mode detection switches.
Figures 11, 13:
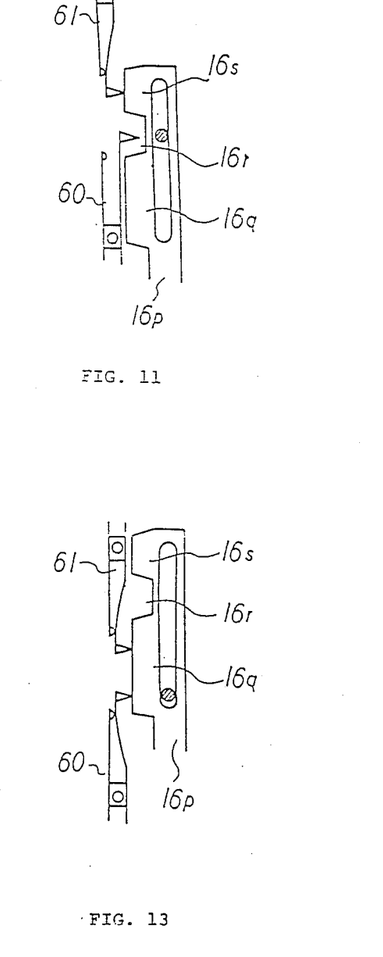
Figure 12:
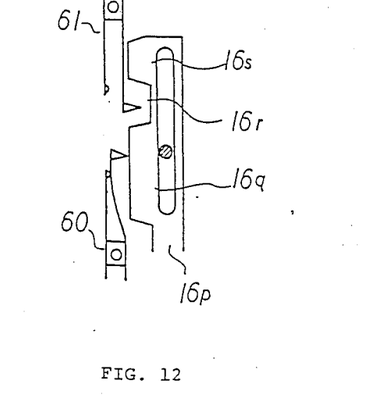

FIGS. 10 through 13 show the positions of the mode detector switches 60 and 61 in various operation mode. FIG. 10 shows the switch position in the serial mode. The contact of the T1 side switch 60 is closed by the projection 16s of the selector plate arm 16p, while the contact of the T2 side switch 61 is open. When the selector plate 16 is shifted one step in the direction A for the T2 mode, the recess 16r comes to the position corresponding to the T1 switch 60 and the projection 16s comes to the position corresponding to the T2 side switch 61. As a result, the T1 side switch 60 is opened while the T2 side switch 61 is closed (FIG. 11). When the selector plate 16 is further shifted one step in the direction A for the T1 mode (FIG. 12), the T1 side switch 60 is closed by the projection 16q while the T2 side switch 61 is opened by the recess 16r. In the dubbing mode, both T1 side switch 60 and T2 side switch 61 are closed by means of the projection 16q as shown in FIG. 13. In this way, the movement of the selector plate 16 can switch-over the pinch rollers and idlers, open or close the switches, electrically detect the current operation mode, and select suitable circuit according to the mode.

Now the auto-stop mechanism and mode selection mechanism are described. FIG. 4 shows the mode selection mechanism in the T2 mode playback operation. Due to the engagement between the projection 20a and the projection 18c of the lock plate 18, the play lever 20 is held for playback operation. The lock release plate 15 rotatably mounted on the mode selector lever 14 is forced in the direction F by the spring 25 but the rotation of the lock release plate 15 is restricted by the stopper pin 14 provided on the mode selector lever 14 so that the projection 18a of the lock release plate 15 comes to the position corresponding to the projection 18a of the lock plate 18. The cam gear 11 is forced for rotation in the direction E by a spring (not shown). Normally, the non-teeth sector 11a of the cam gear 11 faces the drive gear 10 due to the engagement between the projection 11a and trigger lever 13. The drive gear 10 is rotating in the direction F. When the auto-stop sensor detects the end of the tape, the trigger lever 13 moves in the direction A, interlocking with the auto-stop sensor. Consequently, the cam gear 11 is allowed to rotate in the direction E so that the cam gear 11 is rotated with the teeth being engaged with the drive gear 10. The cam 12 coaxially and integrally formed with the cam gear 11 also rotates in the direction E. Since the arm 14c of the mode selector lever 14 is made in contact with the cam 12, the mode selector lever 14 slides in the direction D against the force of the spring 26 when the cam 12 rotates in the direction E. Then, the projection 15a of the lock release plate 15 pushes the projection 18a of the lock plate 18 so that the lock plate 18 slides in the direction D. As a result, engagement between the projection 18c of the lock plate 18 and the projection 20a of the play lever 20 is released. Thus, the tape recorder resumes the stop state. When the selector plate 16 is positioned for the T2 mode, the projection 16a does not come in contact with the inclined section 14d of the mode selector lever 14 even when the mode selector lever 14 slides in the direction D. In the T1 mode or dubbing mode, the auto-stop operation is performed in the same way as in the T2 mode.

The following paragraph describes the switch-over operation from T1 to T2 tape in the serial playback mode. FIG. 3 shows the mode selection mechanism when playback is conducted on the T1 tape in the serial mode. The play lever 20 is held for the playback operation because of engagement of the projection 20a with the projection 18c of the lock plate 18. The lock release plate 15 rotatably mounted on the mode selector lever 14 is pressed at the arm 15b by the projection 16b of the selector plate 16 so that it is rotated in the direction E. Even when the mode selector lever 14 slides in the direction D, the lock release plate 15 still remains being rotated in the direction E to such an extent that the projection 15a of the lock release plate 15 does not contact with the projection 18a of the lock plate 18. At this time, the projection 16a of the selector plate 16 is located at the position corresponding to the inclined section 14d of the mode selector lever 14. Note that in the serial mode, T1 is the first playback side. When T1 tape finishes winding, the auto-stop sensor operates, the trigger lever 13 moves in the direction A interlocking with the auto-stop sensor, and the cam gear 11 is rotated by the spring (not shown) in the direction E. Thus, the cam gear 11 comes in engagement with the drive gear 10 and rotates in the direction E together with the cam 12. With this operation, the mode selector lever 14 slides in the direction D. Since the projection 16b of the selector plate 16 pushes the arm 15b of the lock release plate 15, effecting the same to be rotated in the direction E, the projection 15a of the lock release plate 15 does not push the projection 18a of the lock plate 18. Therefore, the play lever 20 will not be unlocked. Since the projection 16a of the selector plate 16 is located at the position corresponding to the inclined section 14d of the mode selector lever 14, the inclined section 14d pushes the projection 16a of the selector plate 16 when the mode selector lever 14 shifts in the direction D by the rotation of the cam 12 in the direction E. As a result, the selector plate 14 slides one step in the direction A for the T2 mode (as shown in FIG. 4). Due to the function of the selector plate arms 16g and 16p described above, the T1 side pinch roller 22a and idler 41a are released from the capstan 32 and reel stand 43, respectively. At the same time, the T2 side pinch roller 23a and idler 42a are pressed against the capstan 33 and reel stand 44, respectively, so that the operation is switched from the T1 side to the T2 side. Simultaneously, the electric circuit is also switched over from the T1 to the T2 because the T1 side mode detector switch 60 is opened and the T2 side switch 61 is closed.

While only certain embodiments of the present invention have been described, it will be apparent to those skilled in the art that various changes and modifications may be made therein without departing from the spirit and scope of the present invention as claimed.

What is claimed is:

1. A tape recorder comprising:
   a cassette tape compartment in which a plurality of cassette tapes are detachably loaded,
   a capstan on which said plurality of cassette tapes housed in said cassette tape compartment are coaxially mounted,
   a separate roller means for driving each of said plurality of cassette tapes, each of said roller means being mounted so that it can be pressed against said capstan,
   a single control means for selecting any of said plurality of tapes to be driven by said roller means, said single control means being a selector button,
   means commonly used for all cassette tapes for selecting one of a plurality of cassette tape drive modes;
   means including said roller means for driving any selected cassette tape in said selected one of said drive modes,
   a playback and/or recording head provided for each of the plurality of cassette tapes; and
   means for electrically operating said playback and/or recording head provided for each of the cassette tapes, for playback or recording on at least one of said plurality of cassette tapes.

2. The tape recorder of claim 1 wherein each said separate roller means is mounted on a pivoted lever, each said pivoted lever being biased by a spring to press said separate roller means against said capstan, and
   blocking means including a projection for selectively bearing against one end of each said pivoted lever said blocking means selectively acting against the bias of each said spring to space each said separate roller means from said capstan.

3. The tape recorder of claim 1, further comprising: mode detector means which electrically detects the present tape drive mode, interlocking with the roller means position control means.

4. The tape recorder of claim 1, wherein said plurality of cassette tape drive modes comprises the following modes: a mode for driving one of the plurality of cassette tapes independently, a mode for driving at least two cassette tapes simultaneously and a serial drive mode for driving multiple cassette tapes sequentially from a first cassette tape to a second cassette tape.

5. The tape recorder of claim 4, wherein said serial drive mode includes serial drive control means provided for shifting said roller means so that, in the serial drive mode, the roller means for the first cassette tape is separated from the capstan when the first cassette tape has been wound to the end, and the roller means for the second cassette tape that is kept separated from the capstan while the first tape is running is pressed against the capstan to start running the second cassette tape.

6. The tape recorder of claim 1, further comprising at least one of the following means:
- a first fast-forward means for rapidly forwarding at least one of said plurality of cassette tapes in a first direction;
- a second fast-forward means for rapidly forwarding at least one of said plurality of cassette tapes in a second direction (reverse of the first direction);
- means for running at least one of said plurality of cassette tapes at a fixed speed in the first or second direction;
- means for recording information on at least one of said plurality of cassette tapes, interlocking with said fixed-speed tape running means;
- means for reproducing information on at least one of said plurality of cassette tapes, interlocking with said fixed-speed tape running means;
- means for stopping operation of said first or second fast-forward means, fixed-speed tape running means, recording means or playback means; and
- means for pausing operation of said first or second fast-forward means, fixed-speed tape running means, recording means or playback means.

7. The tape recorder of claim 6, wherein when said first or second fast-forward means, fixed-speed tape running means, playback means or recording means is operated, the roller means corresponding to the selected cassette tape to be driven by the driving means is pressed against the capstan.

8. The tape recorder of claim 6, wherein each of said plurality of cassette tapes is operated by at least one of said first and second fast-forward means, fixed-speed tape running means, recording means, playback means, stop means and pause means, the cassette tape closer to the capstan bearing being operated by the same number of means with or larger number of means than the cassette tape farther from the capstan bearing.

9. The tape recorder of claim 6, wherein said plurality of cassette tapes share at least one of said first and second fast-forward means, fixed-speed tape running means, recording means, playback means, stop means and pause means.

10. The tape recorder of claim 9, wherein a control panel is provided for controlling at least two of said first and second fast-forward means, fixed-speed tape running means, recording means, playback means, stop means and pause means, said control panel having operation push buttons for said at least two of the means and being so constructed that the area for the operation buttons for the means shared by said plurality of cassette tapes is larger than that for the means not shared by the plurality of cassette tapes.

* * * * *